US007463819B2

(12) United States Patent
Law et al.

(10) Patent No.: US 7,463,819 B2
(45) Date of Patent: Dec. 9, 2008

(54) VIDEO PLAYBACK METHOD AND APPARATUS

(75) Inventors: Henry Law, Scarborough (CA); Kenneth Man, North York (CA); Peter Cao, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 674 days.

(21) Appl. No.: 10/976,949

(22) Filed: Oct. 29, 2004

(65) Prior Publication Data

US 2006/0093317 A1 May 4, 2006

(51) Int. Cl.
*H04N 7/26* (2006.01)

(52) U.S. Cl. ........................................ 386/124; 386/68

(58) Field of Classification Search .................. 386/46, 386/68, 96, 125; 345/430, 431, 441
See application file for complete search history.

(56) References Cited

U.S. PATENT DOCUMENTS 6,208,350 B1 * 3/2001 Herrera ...................... 345/582
6,339,427 B1 1/2002 Laksono et al.
2003/0218591 A1 11/2003 Shen et al.
2004/0001696 A1 * 1/2004 Kogusuri ..................... 386/68

OTHER PUBLICATIONS

Masahiro Baba and Haruhiko Okumura; Software Processed Level-Adaptive Overdrive (SLAO) Method for Multi-Media LCDs with YUV Video Data; pp. 155-158.

* cited by examiner

*Primary Examiner*—Thai Tran
*Assistant Examiner*—Mishawn Dunn
(74) *Attorney, Agent, or Firm*—Vedder Price P.C.

(57) ABSTRACT

A video playback circuit receives flip call information and vertical synchronization information, and in response determines a pause mode and a playback mode. Flip call information, as is known in the art, provides an indication for flipping between a front buffer and a back buffer, in order to facilitate rendering into one buffer while rasterizing out of the other buffer. Vertical synchronization information describes the completion of rasterizing an image onto a display, and often occurs at periodic intervals, e.g., 60 Hz, 100 Hz. The video playback circuit further includes a pause/playback-based frame buffer pointer information generator. The pause/playback-based frame buffer pointer information generator generates unfiltered frame buffer pointer information when in the pause mode. Otherwise, the pause/playback-based frame buffer pointer information generator generates filtered frame buffer pointer information when in the playback mode. The unfiltered frame buffer pointer information indicates rasterization of unfiltered rasterization data from the frame buffer during the pause mode. Similarly, the filtered frame buffer pointer information indicates rasterization of filtered rasterization data from the frame buffer when in the playback mode.

23 Claims, 5 Drawing Sheets

VIDEO PLAYBACK METHOD AND APPARATUS

FIELD OF THE INVENTION

The present invention generally describes a method and apparatus for video playback and more specifically describes a video playback method and apparatus related to rendering and/or rasterizing video signals.

BACKGROUND OF THE INVENTION

Video graphic adapters (VGA) are used to render video signals to be rasterized on display devices such as computer monitors. In operation, VGAs will generally receive graphics information from a system, such as a computer system, and perform the necessary graphics calculations upon the received information in order to render graphics signals. Once all calculations have been performed upon an object during image rendering, the data representing the object to be rasterized is written into a frame buffer. During image rendering, the graphics calculations are repeated for all objects associated with a specific frame, and data are stored within the frame buffer. During rasterization, the image is read from the frame buffer to create a video signal that is provided to the display device. During image rendering, the graphics calculations are repeated for all objects associated with a specific frame, and data are stored within the frame buffer. The playback of video motion, as opposed to the display of a still or paused image, requires rendering, rasterizing and displaying video information relatively quickly.

Although LCD-type displays are commonly used, LCD-type displays typically have relatively slow response times especially when displaying motion video. Therefore, LCD-type displays are known to employ response time compensation for video playback. Without response time compensation, the video image observed by the human eye becomes blurred, distorted or choppy because the amount of time taken to display an entire frame of video exceeds the amount of time which the display must be refreshed with a new graphic, or new frame. Response time compensation is therefore used in LCD-type displays in order to avoid perception by the human eye.

Typically, response time compensation techniques for video playback on LCD-type displays operate on the rasterizing engine, and therefore have no mechanism for indicating a pause, stop, single-step, or slow-motion rendering of video. As a result, when response time compensation techniques for video playback on LCD-type displays are used, artifacts, aberrations or other types of distortions are displayed during the video stop, pause, single-step or slow-motion modes.

Various other types of filtering techniques facilitate the playback of motion video. For example, other types of filtering used during motion video may include deinterlacing, denoising and other types of temporal filters. However, when motion video is paused, or when a still image is displayed, the filtering techniques may also cause aberrations, due to these compensation techniques.

BRIEF DESCRIPTION OF THE DRAWINGS

The present invention is illustrated by way of example, and not limitation, of the accompanying figures, in which like reference numerals indicate similar elements and in which.

DETAILED DESCRIPTION OF THE PREFERRED EMBODIMENTS

A video playback circuit receives flip call information and vertical synchronization information, and in response determines a pause mode and a playback mode. Flip call information, as is known in the art, provides an indication for flipping between a front buffer and a back buffer, in order to facilitate rendering into one buffer while rasterizing out of the other buffer. Vertical synchronization information describes the completion of rasterizing an image onto a display, and often occurs at periodic intervals, e.g., 60 Hz, 100 Hz. The video playback circuit further includes a pause/playback-based frame buffer pointer information generator. The pause/playback-based frame buffer pointer information generator generates unfiltered frame buffer pointer information when in the pause mode. Otherwise, the pause/playback-based frame buffer pointer information generator generates filtered frame buffer pointer information when in the playback mode. The unfiltered frame buffer pointer information indicates rasterization of unfiltered rasterization data from the frame buffer during the pause mode. Similarly, the filtered frame buffer pointer information indicates rasterization of filtered rasterization data from the frame buffer when in the playback mode.

Among other advantages, the video playback circuit detects the various modes of playback, stop, pause, slow-motion or single-step of motion video in order to determine the appropriate type of rendering, such as filtered or unfiltered rendering in order to improve the display quality of motion video. The video playback circuit applies the appropriate type of rendering during the playback mode and the stop, pause, single-step and slow-motion modes so that, for example, a filter used during the rendering of motion video is appropriately disabled during the stop, pause, single-step or slow-motion video modes referred herein collectively as a "pause mode." As previously described, full-motion video rendering may use a response time compensation technique for video playback on LCD-type displays. This response time compensation technique may employ a pixel voltage overshoot technique that may cause aberrations and other distortions during the pause mode. According to this embodiment, the video playback circuit renders the video during pause mode without filtering, such as the response time compensation technique. As a result, the image display during the pause mode will have no or reduced artifact, aberrations or other types of distortions, thus improving the quality of the image. Further, enhanced filtering techniques such as increased pixel voltage overshoot techniques may be used to further enhance display quality during the playback mode, since the filtering may be disabled during the pause mode.

Figure 1:
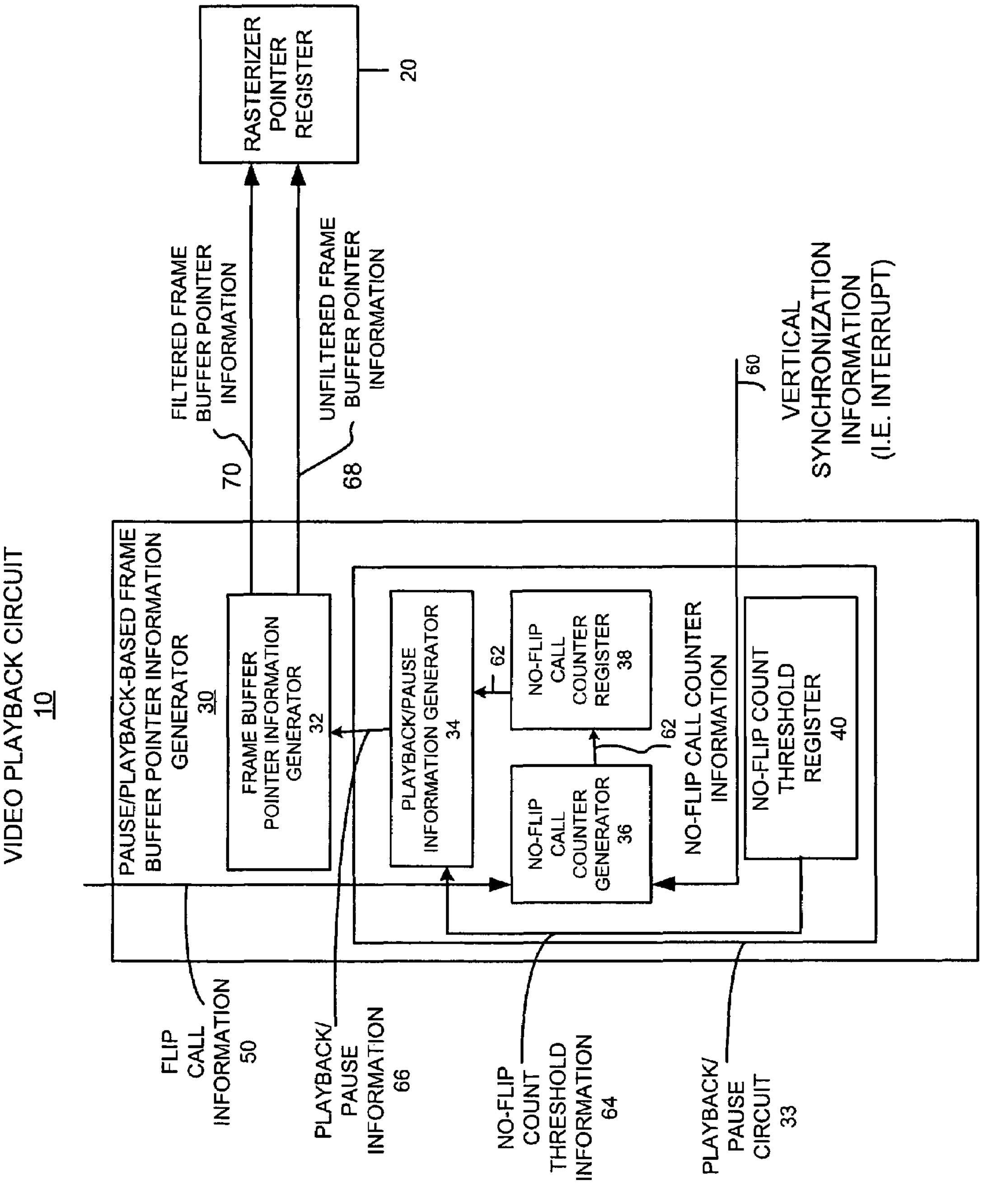
FIG. 1 is a block diagram of a video playback circuit in accordance with one exemplary embodiment of the invention.

FIG. 1 is a block diagram of a video playback circuit 10, including a rasterizing pointer register 20 and a pause/playback-based frame buffer pointer information register 30. The pause/playback-based frame buffer pointer information generator 30 includes a frame buffer pointer information generator 32 and a playback/pause circuit 33. The playback pause circuit 33 includes a playback/pause information generator 34, a no-flip call counter generator 36, a no-flip call counter register 38 and a no-flip count threshold register 40. Any other suitable circuit or method other than the playback/pause circuit 33 may be employed to provide the playback/pause information 66.

The pause/playback based frame buffer pointer information generator 30 may be one or more suitably programmed processors, such as a microprocessor, a microcontroller, a reduced instruction set controller (RISC) or a digital signal processor (DSP), and therefore includes associated memory, which contains instructions that, when executed, cause the pause/playback-based frame buffer pointer information generator 30 to carry out the operations described herein. For example, the rasterizer pointer register 20 may be part of a coprocessor, such as a graphics coprocessor. In addition, the pause/playback-based frame buffer pointer information generator 30, as used herein, may include discrete logic state machines or any other suitable combination of hardware, software, middleware and/or firmware.

According to one embodiment, the various elements of the pause/playback-based frame buffer pointer information generator 30 and the video playback circuit 10 are connected by a plurality of links. The links may be any suitable mechanisms for conveying electrical signals or data, as appropriate. For example, the interface between a pause/playback-based frame buffer pointer information generator 30 and the rasterizer pointer register 20 may be a host processor to a graphics coprocessor interface, such as a PCI bus, an AGP bus, a PCI-express bus, an $I^2C$ (IC to IC) bus or any other suitable type of bus, either standardized or proprietary. Alternatively, the interface between the pause/playback-based frame buffer pointer information generator and the rasterizer pointer register 20 may be an integrated circuit connection within an application-specific integrated circuit (ASIC).

According to one embodiment, the pause/playback-based frame buffer pointer information generator 30 may be part of a computer system, a set-top box, an analog or digital video recorder or any other suitable processor-based system. The computer system or other suitable processor-based system may include a central processing unit, video graphics circuitry, system memory and other suitable peripheral circuits. In such systems, the central processing unit functions as a host processor, while the video graphics circuitry (e.g., a graphics coprocessor) functions as a loosely coupled coprocessor. By way of example, the video graphics circuitry may be an integrated circuit on a single semiconductor die, such as an application-specific integrated circuit (ASIC). Additionally, the video graphics circuitry may include memory, such as, but not limited to, dynamic random access memory (DRAM). This memory may reside on the same semiconductor die (ASIC) as the video graphics circuitry, or it may be separate and connected through board level or package level traces.

For example, the pause/playback-based frame buffer pointer information generator 30 may be part of a host processor or, alternatively, may be part of the video graphics circuitry. Accordingly, the memory may be part of systems memory, graphics memory or any other suitable memory. Additionally, the operations described herein may be implemented in a software program, such as a driver program, executed by a host processor, coprocessor or any other suitable processor.

Figure 2:
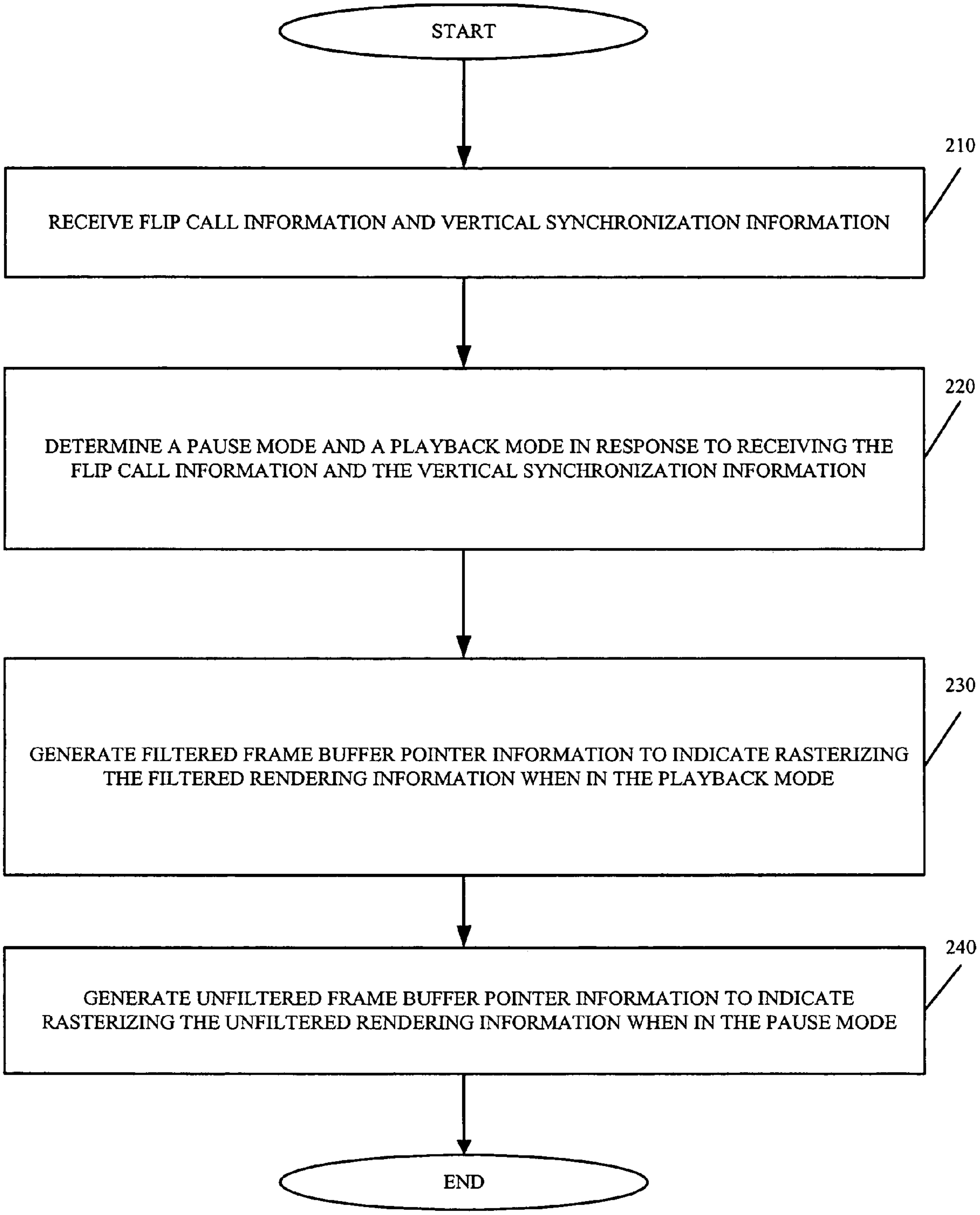
FIG. 2 is a flowchart illustrating an example of a method for playing back video according to one exemplary embodiment of the invention.

FIG. 2 is a block diagram of a method for playing back video. The method may be carried out by the pause/playback-based frame buffer pointer information generator 30; however, any other suitable structure may also be used. It will be recognized that the method beginning with step 210 will be described as a series of operations, but the operations may be performed in any suitable order and may be repeated in any suitable combination.

As shown in step 210, the pause/playback-based frame buffer pointer information generator 30 receives flip call information 50 and vertical synchronization information 60. The flip call information 50, according to one embodiment, may indicate the completion of rendering information into a frame buffer and the beginning of rendering a next frame into the same or another frame buffer. Accordingly, the flip call information 50 is typically used by a rendering engine to synchronize the completion of rendering a frame into a frame buffer and the initiation of rendering a new frame into the same or different frame buffer. For example, as is commonly known in the art, a frame buffer may include a front buffer and a back buffer such that the flip call information 50 indicates a flip between the front buffer and back buffer in order to facilitate rendering and rasterization at approximately the same time. The vertical synchronization information 60 indicates when data in the frame buffer is ready for display. For example, the rasterizing engine may be set to rasterize at a rate of, for example, sixty times per second or one hundred times per second. Note that the rendering rate may vary from, for example, sixteen frames per second, to twenty-four frames per second to thirty frames per second for movies and thus may be different from the rasterization rate.

As shown in step 220, the pause/playback-based frame buffer pointer information generator 30, in response to receiving the flip call information 50 and the vertical synchronization information 60, determines if the video playback circuit 10 is in a pause mode or in a playback mode. The vertical synchronization information 60 is received based on a display refresh. The flip call information 50 may be received, for example, from an application, to indicate the completion of rendering a frame into the frame buffer and the initiation of rendering a new frame into the frame buffer. For example, since the flip call information 50 indicates a request for rendering during each frame of motion video, and since the vertical synchronization information 60 indicates the display refresh rate, then if vertical synchronization information 60 indicates refreshing of the display while the flip call information 50 indicates no rendering, due to, for example, a pause mode, then the pause/playback-based frame buffer pointer information generator 30 may determine that the video playback circuit 10 is in a pause mode.

According to one embodiment, the pause/playback-based frame buffer pointer information generator 30 may determine a number of times the vertical synchronization information 60 is received, while the flip call information 50 is not received. For example, the no-flip call counter generator 36 receives the vertical synchronization information 60 and the flip call information 50 in order to generate no-flip call counter information 62. According to this embodiment, the no-flip call counter information 62 indicates the number of times a vertical refresh has occurred while no flip call requests have occurred. Accordingly, no-flip count threshold information 64 may be determined to accommodate for any difference in the rate of receiving the flip call information 50 during rendering and the rate of receiving the vertical synchronization information 60 during rasterization.

If, for instance, the video playback circuit 10 is in a pause mode, then the rendering engine may temporarily stop producing flip call requests, since rendering is temporarily suspended. As a result, the no-flip call counter generator 36 begins counting the number of times the vertical synchronization information 60 is received, thus indicating how long the video playback circuit 10 is in the pause mode. The no-flip call counter information 62 is then stored in the non-flip call counter register 38. The no-flip call counter register 38 provides the no-flip call counter information 62 to the playback/pause information generator 34. The no-flip count threshold register 40 provides the no-flip count threshold information 64 to the playback/pause information generator 34.

The playback/pause information generator 34, in response to receiving the no-flip count threshold information 64 and the no-flip call count information 62, produces playback/pause information 66. For example, depending on the number of times the vertical synchronization information 60 is received while flip call information 50 is not received, and, depending on the no-flip count threshold information 64, the playback/pause information generator 34 indicates to the frame buffer pointer information generator 32 whether or not the video playback circuit 10 is in a pause or a playback mode.

As shown in step 230, the frame buffer pointer information generator 32 produces the filtered frame buffer pointer information 70 when the playback/pause information 66 indicates the playback mode.

As shown in step 240, the frame buffer pointer information generator 32 produces the unfiltered frame buffer pointer information 68 when the playback/pause information 66 indicates the pause mode.

Figure 3:
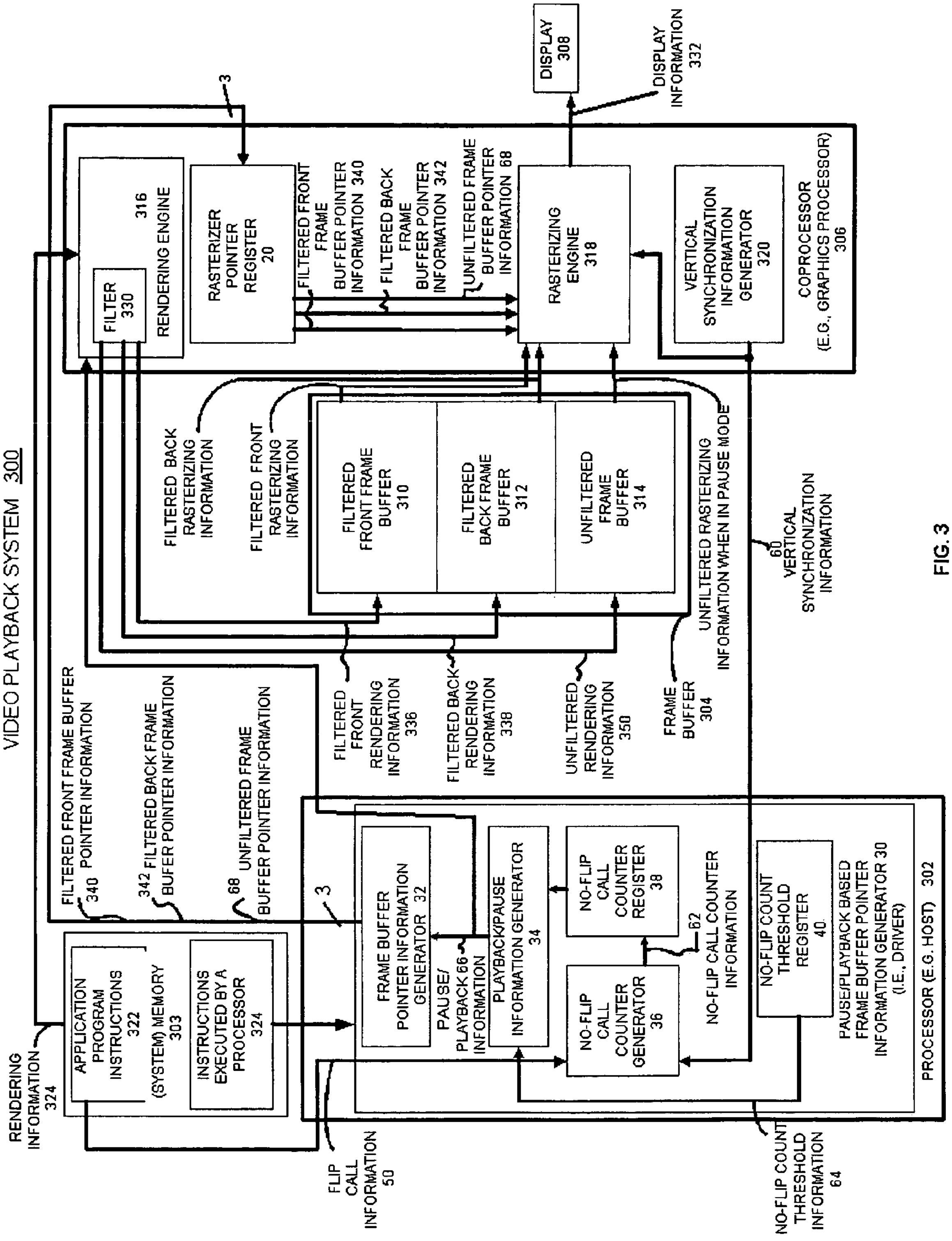
FIG. 3 is a block diagram of a video playback system in accordance with an exemplary body of the invention.

FIG. 3 is a block diagram of a video playback system 300 including a processor 302, system memory 303, a frame buffer 304, a coprocessor 306 and a display 308. The frame buffer 304, according to this embodiment, includes a filtered front frame buffer 310, a filtered back frame buffer 312 and an unfiltered frame buffer 314. The coprocessor 306 includes a rendering engine 316, the rasterizer pointer register 20, a rasterizing engine 318 and a vertical synchronization information generator 320. The rendering engine 316 includes a filter 330. The memory 303, such as system memory, may store application program instructions 322 and instructions 324 executed by the processor 302, such as a host processor. The application program instructions 322 may represent any suitable application program for providing rendering information 324 to the rendering engine 316 and flip call information 50 to the no-flip call counter generator. For example, the application program instructions 322 may represent instructions from an application program such as a DVD player application, a Windows media player application, a Quick Time player application or any other suitable application.

The various elements of the video playback system 300 are linked by a plurality of links. The links may be any suitable mechanisms for conveying electrical signals or data as appropriate. According to one embodiment, the interface between the pause/playback-based frame buffer pointer information generator 30 and the frame buffer 304 and the coprocessor 306 may be a host processor to graphics coprocessor interface, such as a PCI bus, an AGP, a PCI express bus, an $I^2C$ (IC to IC) bus or any other suitable bus, either standardized or proprietary. Alternatively, the interface between the variable clock information generator 230, the graphics engine clock signal generator 210 and the memory clock signal generator 220 may be an integrated circuit interconnection within an application-specific integrated circuit (ASIC).

The memory 303 may be, for example, random access memory (RAM), read-only memory (ROM), optical memory or any suitable storage medium located locally or remotely, such as via a server or distributed memory, if desired. Additionally, the memory 303 may be accessible by a wireless base station, switching system or any suitable network element via the Internet, a wide area network (WAN), a local area network (LAN), a wireless wide access network (WWAN), a wireless local area network (WLAN) such as but not limited to an IEEE 802.11 wireless network, a Bluetooth® network, an infrared communication network, a satellite communication network or any suitable communication interface or network. Similarly, the frame buffer 304 may be, for example, random access memory (RAM), read-only memory (ROM), optical memory or any suitable storage medium located locally or remotely, such as via a server or distributed memory if desired.

According to one embodiment, the pause/playback-based frame buffer pointer information generator 30 may be implemented in a software program, such as a driver or application program, executed by the processor 302 [host] or any suitable processor. The processor 302 may be a computer system or other processor-based system that may include a central processing unit, video graphics circuitry, system memory, such as memory 303, and any other suitable peripheral circuits. For example, the processor 302 may be a central processing unit functioning as a host processor while the coprocessor 306 functions as a video graphics coprocessor. The video graphics coprocessor may function as a loosely functioning coprocessor. By way of example, the coprocessor 306 may be an integrated circuit on a single semiconductor die, such as an application-specific integrated circuit (ASIC). Additionally, the video graphics circuitry may include memory (not shown) such as but not limited to dynamic random access memory (DRAM) in addition to the frame buffer 304. This memory may reside on the same semiconductor die (ASIC) as the video graphics circuitry, or it may be separate through board-level or package-level traces.

Figure 4:
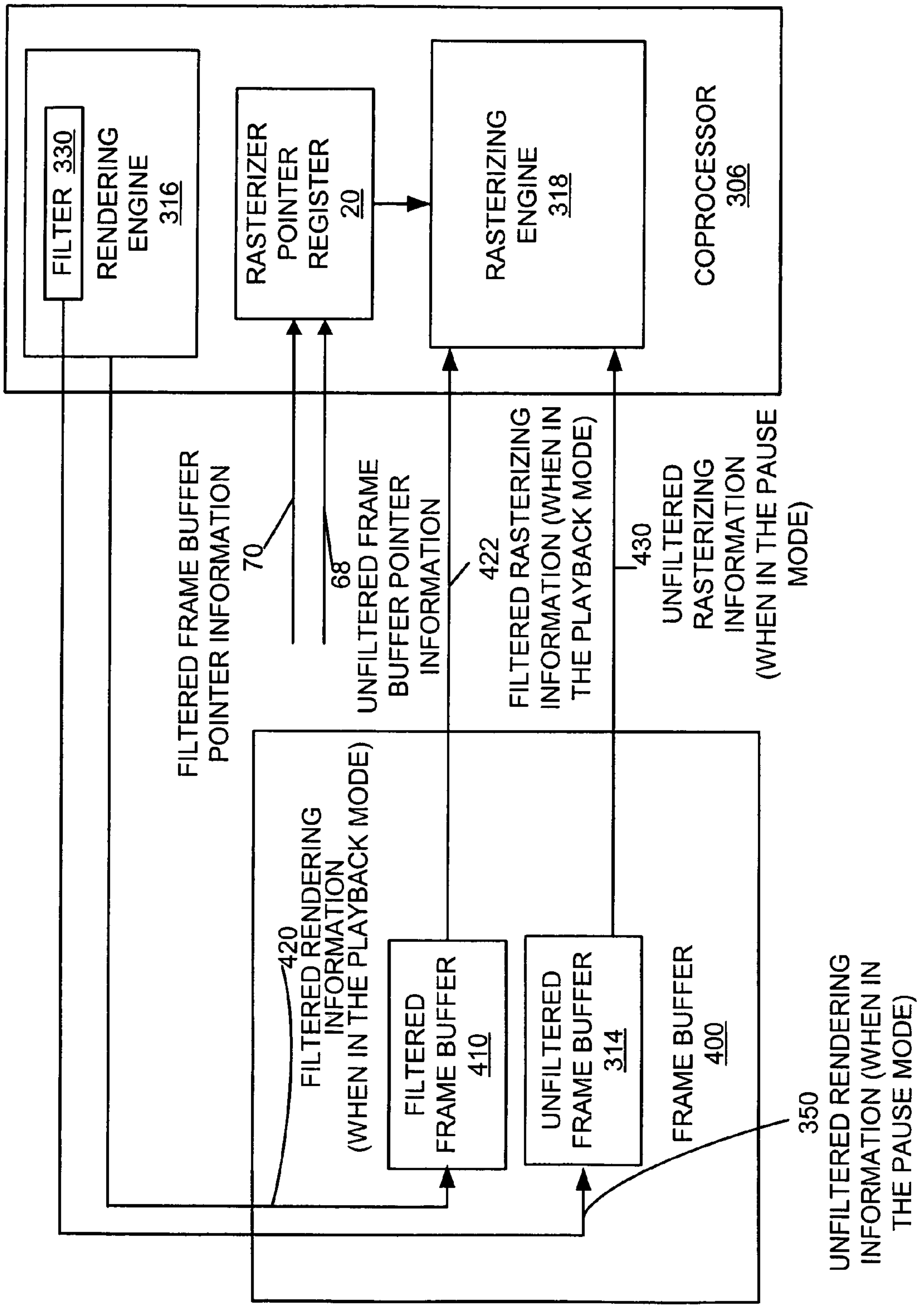
FIG. 4 is a block diagram of the video playback system in accordance with another exemplary body of the invention.

FIG. 4 is a block diagram illustrating a frame buffer 400 including a filtered frame buffer 410 and the unfiltered frame buffer 314. Although FIG. 3 shows the frame buffer 304 with three buffers, the filtered front frame buffer 310, the filtered back frame buffer 312 and the unfiltered frame buffer 314, any suitable number of buffers may be used. FIG. 4 illustrates the frame buffer 400 with two frame buffers, namely, the filtered frame buffer 410 and the unfiltered frame buffer 314. Alternatively, a single frame buffer may be employed. A suitable rasterizing engine 318, for example, may then rasterize a portion of the single frame buffer when, for example, the rendering engine 316 is already rendered into that portion of the single frame buffer. As a result, the rendering engine 316 may render either the filtered rendering information 420 when in the playback mode or the unfiltered rendering information 350 when in the pause mode.

According to one embodiment, the rasterizing engine 318 rasterizes from a same frame buffer such as either the filtered frame buffer 410 or the unfiltered frame buffer 314. According to this embodiment, when a pause mode is detected, then the contents of the unfiltered frame buffer 314 are copied to the filtered frame buffer 410 in order to facilitate rasterization of the unfiltered rasterizing information 430 when in the pause mode. Otherwise, the rasterizing engine 318 rasterizes filtered rasterizing information 422 when in the playback mode. According to a third embodiment, copying between frame buffers is not performed. According to this embodiment, the rasterizing engine 318 rasterizes either the unfiltered frame buffer 314 or the filtered frame buffer 410 according to the frame buffer pointer information, such as the unfiltered frame buffer pointer information 68 and the filtered frame buffer pointer information 70.

According to yet another embodiment, the frame buffer 304 as shown in FIG. 3 includes the filtered front frame buffer 310 and a filtered back frame buffer 312 in order to facilitate front and back buffer flipping, as is commonly known in the art. According to this embodiment, during, for example, the playback mode, the rasterizer pointer register 20 synchronizes rasterization based on filtered front frame buffer pointer information 340 and filtered back frame buffer pointer information 342. Note that, since the image in the unfiltered frame buffer 314 during the pause mode is static, there is no need for flipping the front and back frame buffer during the pause mode. According to this embodiment, the unfiltered frame buffer pointer information 68 causes the rasterizing engine 318 to rasterize a same frame of unfiltered rendering information 430 when in the pause mode.

Figure 5:
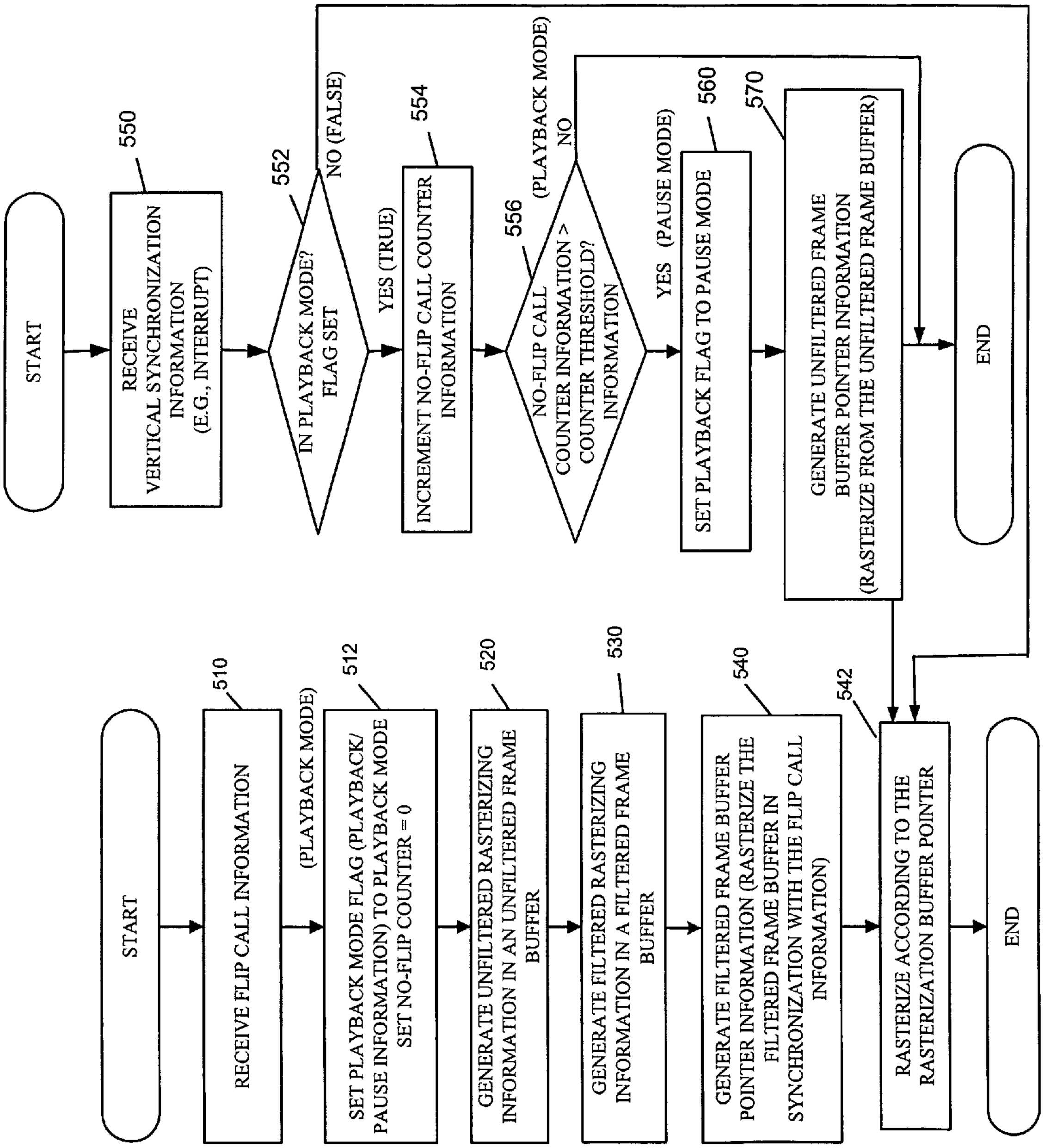
FIG. 5 is a flowchart illustrating another example of a method for playing back video according to another exemplary body of the invention.

FIG. 5 illustrates a method for playing back video according to another exemplary embodiment of the invention. The method may be carried out by the video playback circuit 10 and the video playback system 300 including the pause/playback-based frame buffer pointer information generator 30; however, any other suitable structure may be used. It will be recognized that the method beginning with steps 510 and 550 will be described as a series of operations, but the operations may be performed in any suitable order and may be repeated in any suitable combination.

The flow path on the left indicates the processing of flip call information 50, which generally indicates operation during the playback mode. The right side of FIG. 5 generally illustrates the processing also of the vertical synchronization information 60 for determining when the video playback circuit 10 is in the pause mode or in the playback mode. Since the vertical synchronization 60 is received independently from the flip call information 50, the method shown in FIG. 5 illustrates two independent flow paths for the processing of the respective information.

As shown in step 510, the pause/playback-based frame buffer pointer information generator 30 receives flip call information 50. As previously stated, the no-flip call counter generator 36 receives the flip call information 50 at periodic intervals when in the video playback mode. However, when in the video pause mode, the flip call information 50 may either cease to be received or may indicate that no flip call request is made.

Referring to the right side of FIG. 5 and as shown in step 550, the no-flip call counter generator 36 receives the vertical synchronization information 60 from the vertical synchronization information generator 320 at periodic intervals. Since the rasterizing engine 318 continuously provides display information 332 on a periodic basis to display 308, the pause/playback-based frame buffer pointer information generator 30 periodically receives the vertical synchronization information 60. According to one embodiment, the vertical synchronization information 60 is an interrupt request provided to processor 302, as is commonly known in the art.

As shown in step 512, in response to receiving the flip call information 50, the pause/playback-based frame buffer pointer information generator 30 determines that a new video frame is about to be rendered and that the video playback circuit 10 is in the playback mode by setting the playback/pause information 66, also referred to herein as a playback flag, to the playback mode.

As shown in step 520, the frame buffer pointer information generator 32 provides the frame buffer pointer information such as the filtered frame buffer pointer information 70 and the unfiltered frame buffer pointer information 68 to the rasterizer pointer register 20.

As shown in step 530 and in FIG. 4, the filter 330, according to one embodiment, receives the unfiltered rendering information 350 and in response produces the filtered rendering information 420 and the unfiltered rendering information 350 when in the playback mode. For example, filter 330 may be any suitable filter such as an LCD response time compensator, a deinterlacer, a denoiser or any suitable temporal filter. The temporal filter may perform any suitable type of video processing. In response, the rendering engine 316 provides filtered rendering information for 20 when in the playback mode and unfiltered rendering information when in the pause mode.

As shown in step 540, the frame buffer pointer information generator 32 generates the filtered frame buffer pointer information 70, and the unfiltered frame buffer pointer information 68 synchronously with the flip call information 50 and/or the vertical synchronization information 60. As is known in the art, the frame buffer pointer information 68, 70, 340, and 342 indicates when rasterization should begin synchronously with the completion of a rendered image according to the received flip call information 50 and/or the vertical synchronization information 60.

As shown in step 542, in response to the frame buffer pointer information generator 32 providing the filtered frame buffer pointer information to the rasterizer pointer register 20, the rasterizing engine 318 performs rasterization of the filtered frame buffer 410 (or alternatively the filtered front frame buffer 310 or the filtered back frame buffer 312). According to one embodiment, the rendering engine 316 produces either filtered rendering information 420 or unfiltered rendering information 350 in response to receiving playback/pause information 66. For example, the playback/pause information generator 34 may provide the playback/pause information 66 to the rendering engine 316 so that the rendering engine 316 need only generate either the unfiltered rendering information 350 or the filtered rendering information 420 (or, alternatively, the filtered front rendering information 336 and the filtered back rendering information 338). Alternatively, the rendering engine 316 may generate both the filtered rendering information 420 and the unfiltered rendering information 350, even though only one will be ultimately rasterized at any given time.

As shown in step 550, the vertical synchronization information generator 320 provides the video synchronization information 60 to the no-flip call counter generator 36. As previously stated, the no-flip call counter generator 36 determines the number of times that vertical synchronization information 60 is received when flip call information 50 is not received. In response, the no-flip call counter generator 36 generates the no-flip call counter information 62.

As shown in step 552, the playback/pause information generator 34 determines if the playback mode flag is set to indicate a playback mode or if it is set to indicate a pause mode. According to one embodiment, the rasterizer pointer register 20 indicates repeating rasterization of a same frame of unfiltered rasterization information for 30 when in the pause mode. Among other advantages, since the image in the unfiltered frame buffer 314 does not change when in the pause mode, there is no need for the rendering engine 316 to again write the unfiltered rendering information 350 into the unfiltered frame buffer 314. If the playback mode flag has not been set indicating the pause mode, then the frame buffer pointer information generator 32 generates the frame buffer pointer information 70 as shown in step 542.

As shown in step 554, if the playback mode flag is set to indicate the playback mode, then the no-flip call counter generator 36 increments the no-flip call counter information 62.

As shown in step 556, the playback/pause information generator 34 receives the no-flip call counter information 62 and the no-flip count threshold information 64 and in response generates the pause/playback information 66 to indicate either the pause or the playback mode. If the no-flip call counter information 62 is less than the no-flip count threshold information 64, then the playback/pause information generator 34 establishes the playback mode and processing continues, for example, to await receipt of the next flip call information 50 at step 510 or the vertical synchronization information 60 at step 550. Although processing is shown to end, as will be recognized by one skilled in the art, processing may continue upon receipt of the flip call information 50 at step 510 or upon receipt of the vertical synchronization information 60 at step 350.

As shown in step 560, if the playback/pause information generator 34 determines that the no-flip call counter information 62 is greater than the no-flip count threshold information 64, then a pause condition is established and the playback flag is set to indicate that the pause mode is established.

As shown in step 570, the frame buffer pointer information generator 32 generates the unfiltered frame buffer pointer information 68. The rasterizer pointer register 20, in response to receiving the unfiltered frame buffer pointer information 68, indicates rasterizing the unfiltered frame buffer 314.

Among other advantages, the video playback circuit 10 detects the various modes of playback, stop, pause, slow-motion or single-step of motion video in order to determine the appropriate type of rendering, such as filtered or unfiltered rendering in order to improve the display quality of motion video. The video playback circuit 10 applies the appropriate type of rendering during the playback mode and the stop, pause, single-step and slow-motion modes so that, for example, the filter 330 used during the rendering of motion video is appropriately disabled during the stop, pause, single-step or full-motion video modes. As previously discussed, full-motion video rendering may use a response time compensation technique for video playback on LCD-type displays. This response time compensation technique may employ a pixel voltage overshoot technique that may cause aberrations and other distortions during the pause mode. According to this embodiment, the video playback circuit 10 renders the video during pause mode without filtering, such as the response time compensation technique. As a result, the image display during the pause mode will have no or reduced artifact, aberrations or other types of distortions, thus improving the quality of the image. Further, enhanced filtering techniques such as increased pixel voltage overshoot techniques may be used to further enhance display quality during the playback mode, since the filtering may be disabled during the pause mode.

It is understood that the implementation of other variations and modifications of the present invention in its various aspects will be apparent to those of ordinary skill in the art, and that the invention is not limited by the specific embodiments described. It is therefore contemplated to cover by the present invention any and all modifications, variations or equivalents that fall within the spirit and scope of the basic underlying principles disclosed and claimed herein.

The invention claimed is:

1. A video playback circuit comprising:

a pause/playback-based frame buffer pointer information generator operative to receive flip call information and vertical synchronization information, and in response to:

determine a pause mode and a playback mode; and generate unfiltered frame buffer pointer information according to the pause mode, otherwise generate filtered frame buffer pointer information according to the playback mode.

2. The video playback circuit of claim 1 wherein the pause/playback-based frame buffer pointer information generator is operative to generate the unfiltered frame buffer pointer information to repeat rasterization of a same frame of unfiltered rasterization information when in the pause mode.

3. The video playback circuit of claim 1 wherein the pause/playback-based frame buffer pointer information generator is operative to:

generate the filtered frame buffer pointer information to rasterize filtered rendering information when in the playback mode; and generate the unfiltered frame buffer pointer information to rasterize unfiltered rendering information when in the pause mode.

4. The video playback circuit of claim 1 wherein the pause/playback-based frame buffer pointer information generator is operative to generate pause/playback information to:

indicate filtered rendering when in the playback mode; and indicate unfiltered rendering when in the pause mode.

5. A video playback circuit comprising:

a pause/playback-based frame buffer pointer information generator operative to receive flip call information and vertical synchronization information, and in response to:

determine a number of times the vertical synchronization information is received while the flip call information is not received, to produce no-flip counter information; and generate unfiltered frame buffer pointer information according to a pause mode when the no-flip counter information exceeds no-flip count threshold information, otherwise generate filtered frame buffer pointer information according to a playback mode.

6. The video playback circuit of claim 5 wherein the pause/playback-based frame buffer pointer information generator is operative to generate the unfiltered frame buffer pointer information to repeat rasterization of a same frame of unfiltered rasterization information when in the pause mode.

7. The video playback circuit of claim 5 wherein the pause/playback-based frame buffer pointer information generator is operative to:

generate the filtered frame buffer pointer information to rasterize filtered rendering information when in the playback mode; and generate the unfiltered frame buffer pointer information to rasterize unfiltered rendering information when in the pause mode.

8. The video playback circuit of claim 5 wherein the pause/playback-based frame buffer pointer information generator is operative to generate pause/playback information to:

indicate filtered rendering when in the playback mode; and indicate unfiltered rendering when in the pause mode.

9. A video playback system comprising:

memory containing instructions executable by a processor that causes the processor to:

receive flip call information and vertical synchronization information, and in response to:

determine a pause mode and a playback mode; and generate unfiltered frame buffer pointer information when in the pause mode, otherwise generate filtered frame buffer pointer information when in the playback mode;

a frame buffer operative to receive unfiltered rendering information when in a pause mode and filtered rendering information when in a playback mode; and a rasterizing engine, operatively coupled to the frame buffer and operative to receive the unfiltered rendering information and the filtered rendering information and in response to rasterize the filtered rendering information according to the filtered frame buffer pointer information when in the playback mode and to rasterize the unfiltered rendering information according to the unfiltered frame buffer pointer information when in the pause mode.

10. The video playback apparatus of claim 9 wherein the rasterizing engine repeats rasterization of a same frame of unfiltered rendering information when in the pause mode.

11. The video playback apparatus of claim 9 further including:

a rendering engine operative to produce the filtered rendering information during the playback mode and the unfiltered rendering information during the pause mode.

12. The video playback apparatus of claim 11 wherein the rendering engine further includes a filter operative to receive the unfiltered rendering information and in response to produce the filtered rendering information, wherein the filter is selected from at least one of: an LCD response time compensator, a temporal filter, a deinterlacer and a denoiser.

13. The video playback apparatus of claim 9 wherein the frame buffer further includes:

an unfiltered frame buffer operative to receive the unfiltered rendering information and in response provide the unfiltered rendering information to the rasterizing engine according to the unfiltered frame buffer pointer information when the rasterizing engine is in the pause mode; and a filtered frame buffer operative to receive the filtered rendering information and in response provide the filtered rendering information to the rasterizing engine according to the filtered frame buffer pointer information when the rasterizing engine is in the playback mode.

14. A video playback system comprising:

memory containing instructions executable by a processor that causes the processor to:

receive flip call information and vertical synchronization information;

determine a number of times the vertical synchronization information is received while the flip call information is not received to produce no-flip counter information; and generate unfiltered frame buffer pointer information according to a pause mode when the no-flip counter information exceeds no-flip count threshold information, otherwise generate the filtered frame buffer pointer information according to a playback mode;

a frame buffer operative to receive unfiltered rendering information when in the pause mode and filtered rendering information when in the playback mode; and a graphics processor, operatively coupled to the processor, the memory and the graphics processor, including:

a rasterizing engine, operatively coupled to the frame buffer and to the processor and operative to receive the unfiltered rendering information, the filtered rendering information and the frame buffer pointer information and in response to rasterize, according to the filtered frame buffer pointer information, the filtered rendering information when in the playback mode and to rasterize, according to the unfiltered frame buffer pointer information, the unfiltered rendering information when in the pause mode.

15. The video playback apparatus of claim 14 wherein the memory includes instructions executable by the processor that cause the processor to generate the frame buffer pointer information such that the rasterizing engine repeats rasterization of a same frame of unfiltered rasterization information when in the pause mode.

16. The video playback apparatus of claim 14 wherein the rasterizing engine further includes a rasterizer pointer register, operatively coupled to the processor and operative to receive the frame buffer pointer information according to at least one of: the playback mode and the pause mode, and in response to rasterize the frame buffer.

17. A method for playing back video comprising:

receiving flip call information and vertical synchronization information;

determining a pause mode and a playback mode in response to receiving the flip call information and the vertical synchronization information; and generating unfiltered frame buffer pointer information according to the pause mode, otherwise generating filtered frame buffer pointer information according to the playback mode.

18. The method of claim 17 including:

generating the unfiltered frame buffer pointer information to repeat rasterization of a same frame of unfiltered rasterization information when in the pause mode.

19. A method for playing back video comprising:

receiving flip call information and vertical synchronization information;

determining a number of times the vertical synchronization information is received while the flip call information is not received to produce no-flip counter information;

establishing a video pause mode when the no-flip counter information exceeds a predetermined threshold, otherwise establishing the playback mode;

receiving filtered rendering information;

receiving unfiltered rendering information;

generating filtered frame buffer pointer information to indicate rasterizing the filtered rendering information when in the playback mode; and generating unfiltered frame buffer pointer information to indicate rasterizing the unfiltered rendering information when in the pause mode.

20. The method of claim 19 including:

generating the unfiltered frame buffer pointer information to repeat rasterization of a same frame of unfiltered rasterization information when in the pause mode.

21. The method of claim 19 including:

wherein the filtered rendering information is produced in response to performing at least one of: LCD response time compensation, temporal filtering, deinterlace filtering and denoise filtering.

22. A memory storing instructions executable by one or more processing devices that causes the one or more processing devices to:

receive flip call information and vertical synchronization information;

determine a pause mode and a playback mode in response to receiving the flip call information and the vertical synchronization information;

generate filtered frame buffer pointer information to indicate rasterizing the filtered rendering information when in the playback mode; and generate unfiltered frame buffer pointer information to indicate rasterizing the unfiltered rendering information when in the pause mode.

23. The memory of claim 22 containing executable instructions that causes the one or more processing devices to:

generate the unfiltered frame buffer pointer information to repeat rasterization of a same frame of unfiltered rasterization information when in the pause mode.

* * * * *